(12) United States Patent
Fujita et al.

(10) Patent No.: US 7,325,888 B2
(45) Date of Patent: Feb. 5, 2008

(54) RUBBER CRAWLER HAVING EXCELLENT STRAIGHT DRIVING PROPERTY

(75) Inventors: Yasuaki Fujita, Yokohama (JP); Shuichi Matsuo, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 59 days.

(21) Appl. No.: 10/558,302

(22) PCT Filed: May 27, 2004

(86) PCT No.: PCT/JP2004/007272

§ 371 (c)(1),
(2), (4) Date: May 24, 2006

(87) PCT Pub. No.: WO2004/106148

PCT Pub. Date: Dec. 9, 2004

(65) Prior Publication Data

US 2006/0232129 A1 Oct. 19, 2006

(30) Foreign Application Priority Data

May 28, 2003 (JP) .............................. 2003-150307

(51) Int. Cl.
*B62D 55/24* (2006.01)
*F16G 1/04* (2006.01)
(52) U.S. Cl. .................... 305/167; 305/166; 305/170
(58) Field of Classification Search ............... 305/165, 305/166, 167, 170, 173, 177, 178
See application file for complete search history.

(56) References Cited

U.S. PATENT DOCUMENTS 3,712,689 A * 1/1973 Chaumont .................. 305/166
4,721,498 A * 1/1988 Grob ........................ 474/261
5,145,242 A * 9/1992 Togashi ..................... 305/171
6,536,852 B2 * 3/2003 Katayama et al. .......... 305/170

FOREIGN PATENT DOCUMENTS

| JP | 48-5643 | | 2/1973 |
| JP | 54-40428 | * | 3/1979 |
| JP | 2-92703 A | | 4/1990 |
| JP | 5-58358 | * | 3/1993 |
| JP | 6-144310 | * | 5/1994 |
| JP | 9-226320 A | | 9/1997 |
| JP | 11-139361 A | | 5/1999 |
| JP | 2002-178965 A | | 6/2002 |

* cited by examiner

Primary Examiner—Russell D. Stormer
(74) Attorney, Agent, or Firm—Sughrue Mion, PLLC

(57) ABSTRACT

A rubber crawler having a very good straight driving property is obtained by modifying a method of embedding bias cords in a rubber crawler and neutralizing shear stresses caused by tensile load of bent portions of the crawler when the crawler is entrained about a vehicle main body. The rubber crawler is comprised of an endless rubber elastic body, a main cord row, two layers of bias cords having opposite angles of inclination, guide projections, and a lug. The bias cords of the first layer at a side near the main cord row are embedded over a region having substantially the same transverse dimension as that of the main cord row, at a fixed angle of inclination, and the bias cords of the second layer are divided into two sections, covering a region having substantially the same transverse dimension as that of the bias cords of the first layer other than a portions corresponding to the guide projections.

6 Claims, 1 Drawing Sheet

RUBBER CRAWLER HAVING EXCELLENT STRAIGHT DRIVING PROPERTY

TECHNICAL FIELD

The present invention relates to improvement of rubber crawlers, and more specifically to improvement in the straight driving property of a rubber crawler having no core metal embedded therein.

BACKGROUND ART

A rubber crawler is entrained about driving wheels and idle wheels provided at a vehicle main body, and used for running the vehicle. However, usually, a row of reinforcing tension members (hereinafter referred to as a main cord row) such as a row of steel cords is embedded in a rubber crawler in the longitudinal direction thereof, and two layers of bias cords, having opposite bias angles, are simultaneously embedded at an outer peripheral side of the main cord row. These bias cords exist to allow more smooth rotation or to prevent a crack from reaching the main cord row even when the crack occurs in a rubber part.

However, some problems do occur due to the bias cords being embedded in the rubber crawler, and there has been pointed out the disadvantage that bias cords (of a second layer) embedded at a position more remote, than bias cords of a first layer, with respect to the main cord row that serves as a neutral position of rotation, exhibits larger sheer stress than the bias cords of the first layer, thereby the rubber crawler causing the vehicle to run slantingly.

This effect is particularly distinct when the rubber crawler is entrained about driving wheels and rotated, resulting in the rubber crawler running slantingly. This tendency occurs significantly in the case of rubber crawlers having a small widthwise dimension. To this end, in conventional methods, the vehicle main body is equipped with an alignment mechanism for adjusting tension. In this alignment mechanism, adjustment must be carried out every time each rubber crawler is mounted in the vehicle main body.

In a case in which such alignment adjustment is not carried out, one-sided driving of the rubber crawler may occur, and partial abrasion of rubber that forms the rubber crawler may occur at an early stage, thereby resulting in a short-lived rubber crawler. Further, in some cases, such rubber crawlers may frequently come off of wheels.

In order to deal with the aforementioned problems, as a rubber crawler structure, a technique using the alignment mechanism as described above without consideration of neutralization of shear stress needs to be provided, or it is necessary that the bias cords in the first layer and the bias cords in the second layer should have different bias angles, or that the number of bias cords per unit width should be changed, or that the width of a bias cord row in the second layer is made smaller than that in the first layer, as disclosed in Japanese National Phase Publication (JP-T) No. 63-502978. However, these techniques also present various problems.

Specifically, when a structure in which the angles of bias cord rows are changed is used, although some effects are obtained, plural types of bias cords are required, and management of the operation process becomes extremely important. As a result, the workability may significantly deteriorate. Similarly, even in the technique of changing the number of bias cords per unit width, the types of bias cords may increase and management thereof becomes difficult. As a result, there is a high possibility that the bias cords to be used may be mistaken.

Moreover, in the technique in which the width of the bias cords in the second layer is made smaller, the rigidity of a transverse-direction end of a rubber crawler to be produced, that is, an edge portion of the rubber crawler, becomes low. When the rubber crawler thus formed is used for running the vehicle, edge deflection caused by running on projections or the like on a road surface occurs repeatedly. As a result, there arises a problem that rubber cracking is caused by the edge deflection, for example.

DISCLOSURE OF THE INVENTION

Problems to be Solved by the Invention

The present invention has been achieved in view of the aforementioned conventional art, and a main object thereof is to make improvements in the straight driving property of a rubber crawler having no core metal embedded therein by modifying a method of embedding bias cords in the rubber crawler.

Means for Solving the Problems

The subject matter of the present invention is a rubber crawler having an excellent straight driving property, comprising: an endless rubber elastic body; a main cord row embedded in the rubber elastic body in its longitudinal direction; two layers of bias cords which are embedded at an outer peripheral side of the main cord row and form opposite bias angles; guide projections formed at the center of an inner peripheral surface of the rubber crawler at fixed pitches therebetween; and a lug formed on an outer peripheral surface of the rubber crawler, wherein the bias cords of a first layer at a side near the main cord row are embedded at a fixed angle of inclination over a region having substantially the same transverse dimension as that of the main cord row, and the bias cords of a second layer are divided into two sections, covering a region having substantially the same transverse dimension as that of the bias cords of the first layer other than a portion located directly below/above the guide projections, said bias cords of the second layer being embedded at an angle of inclination opposite to that of the bias cords of the first layer. Most preferably the aforementioned opposite angles of inclination are equal to each other, and the preferred angle is in the range of 25 to 45 degrees.

Another subject matter of the invention relates to an internal structure of a rubber crawler including bias cords for neutralizing shear stresses caused by tensile load of the bent crawler when the rubber crawler is entrained about the driving wheels. The arrangement of the bias cords is specified in consideration of the positional relationship between the two layers of bias cords so as to achieve neutralization of shear stresses. As a result, the possibility that the rubber crawler drives in a slanting manner is substantially eliminated, and a rubber crawler having an excellent straight driving property can be obtained.

It is found upon a detailed checking of the driving behavior of a rubber crawler having no core metal embedded therein, that the driving behavior of the rubber crawler is greatly influenced by the positions of bias cords (usually, two layers of bias cords) to be embedded, and the bias angle of the bias cords. Usually, two layers of bias cords having opposite bias angles are embedded. It is substantially impossible to change the bias angle of bias cords for each of the two layers or the number of pieces of cords to be embedded, as mentioned above. Under these circumstances, the present invention has been achieved to obtain an excellent straight driving property of the rubber crawler.

Particularly, when the bias cords of the second layer are considered, it has been revealed that both side edges of the bias cords of the second layer in the transverse direction need to be substantially aligned with those of the bias cords of the first layer, respectively, for the purpose of preventing cutting of edges. On the other hand, load is almost continually applied to a central region of the rubber crawler and its vicinities due to driving wheels, idle wheels, tracker rollers and the like, and therefore, it is found that such region of the rubber crawler does not cause skewed driving. However, in a conventional structure of a rubber crawler, particularly, in a method of embedding bias cords, two layers of bias cords are embedded so as simply to be laminated even in the central region of the rubber crawler. Further, it has been found that the bias cords of the second layer provided at a side more remote, than the bias cords of the first layer, with respect of the main cord row exert a larger influence on the driving property of the rubber crawler than the bias cords of the first layer. The present invention has been attained in view of this.

Accordingly, the present invention provides a structure in which the bias cords of the second layer are embedded so as to be divided into two sections with a space provided therebetween at the center of the rubber crawler in its transverse direction. In this structure, shear stresses acting on the bias cords of the first layer and on the bias cords of the second layer coincide with each other in opposite directions so as to be neutralized, and the skew of the crawler is suppressed. The space formed at the center of the rubber crawler needs to be set to have a dimension of an appropriate value, and is related to distances (a, b) between the main cord row and each of the first and second layers of bias cords. Assuming that the first layer of bias cords has a transverse dimension A and the second layer of bias cords has a transverse dimension B, it is preferable that the equation a×A=b×B is satisfied. Further, it is preferable that the transverse dimensions of the two divided sections of bias cords of the second layer are substantially equal to each other.

In the present invention, the bias cords produced based on the same criterion as described above are used to form bias cords of the first layer and bias cords of the second layer, such that they have opposite bias angles. Thus, one type of bias cord suffices and the production cost thereby becomes low. In addition, in the manufacturing process, as the transverse dimensions of the first layer and the second layer of bias cords are completely different from each other, there is no possibility that these layers of bias cords may be mistaken. A rubber crawler which achieves the aforementioned object is thus obtained.

EFFECTS OF THE INVENTION

The rubber crawler of the present invention has the aforementioned structure. In the rubber crawler including bias cords, shear stresses caused by the tensile load of bent portions of the crawler when entrained about a main body are neutralized, and the rubber crawler thus obtained has an excellent straight driving property.

BEST MODE FOR CARRYING OUT THE INVENTION

Figure 1:
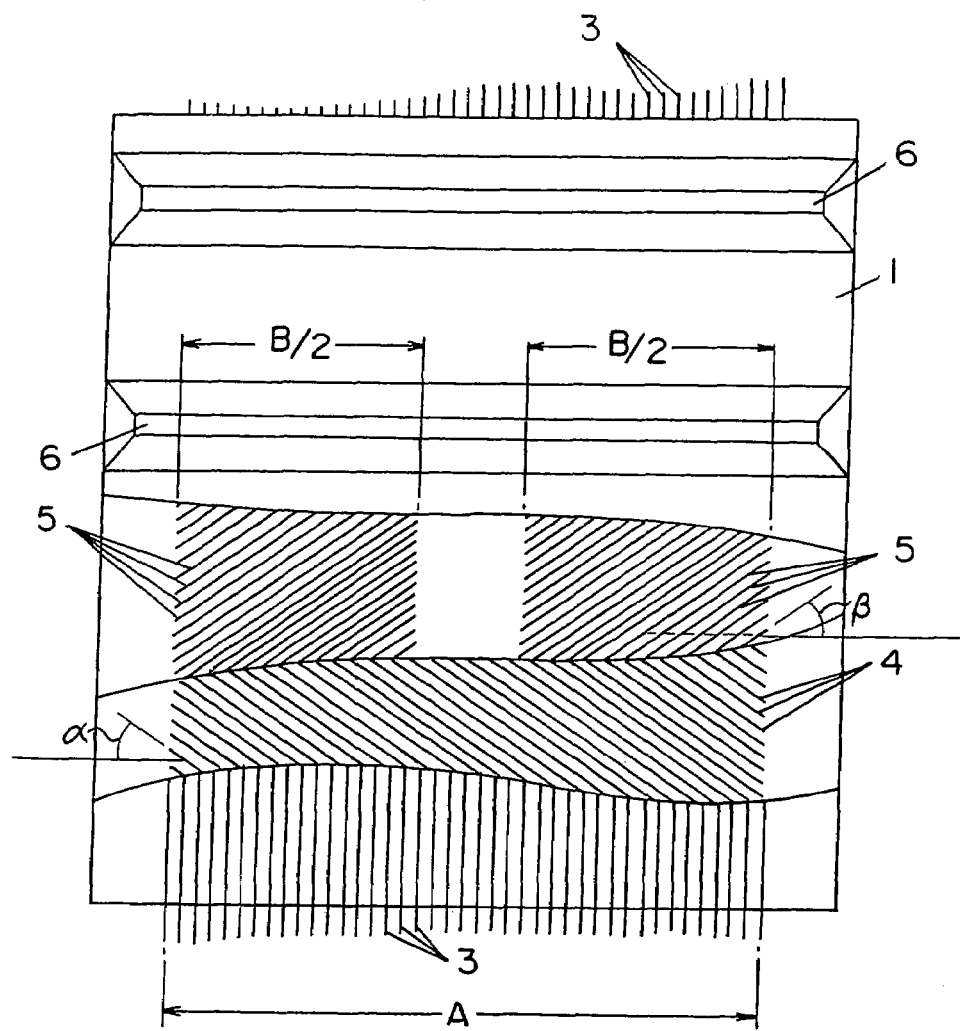
FIG. 1 is a plan view showing an inner peripheral side of a rubber crawler according to the present invention.
Figure 2:
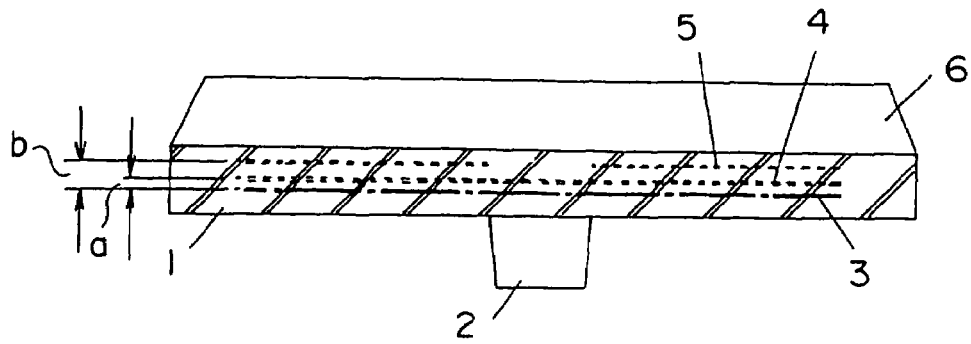
FIG. 2 is a cross sectional view along a widthwise direction of FIG. 1.

The present invention will be further described below in detail with reference to an embodiment thereof. FIG. 1 is a plan view showing an inner peripheral side of a rubber crawler according to the present invention. FIG. 2 is a cross sectional view along a widthwise direction of FIG. 1. Reference numeral 1 denotes a rubber elastic body that serves as a base body of a rubber crawler, and the rubber elastic body is formed continuously from the top to the bottom of FIG. 1. Reference numeral 2 denotes a guide projection provided at the central portion of the rubber crawler in its transverse direction at fixed pitches therebetween. Reference numeral 3 denotes a main cord row (a row of steel cords) embedded in the rubber elastic body 1 along its longitudinal direction. Reference numeral 4 denotes bias cords (of a first layer) embedded adjacent to and at the outer peripheral side of the main cord row 3, and reference numeral 5 denotes bias cords (of a second layer) embedded at the outer side of the bias cords of the first layer. Reference numeral 6 denotes a lug.

The steel cords which form the main cord row 3 each have a cord diameter of 5.25 $\phi$ and a tensile force of 3600 kg/cord, and one steel cord is embedded at an interval of 15 mm. Further, the bias cords 4 and 5 each have a cord diameter of 1.89 $\phi$ and a tensile force of 400 kg/cord. These bias cords are embedded such that 17 separate cords are arranged within a distance of 50 mm. The bias cords are cut in advance so that the angle ($\alpha$) of the bias cords with respect to the main cord row becomes 38 degrees. The ratio of the cord diameter (d) of the bias cords to the cord diameter (D) of the main cords is usually set in a range of approximately 0.3 to 1.0 (d/D).

An interval a between the main cord row 3 and the bias cords (of the first layer) 4 is 5.7 mm and an interval b between the main cord row 3 and the bias cords (of the second layer) 5 is 8.85 mm. The rubber elastic body 1 has a thickness of 32 mm and a transverse dimension of 406 mm. Further, the transverse dimension A of the bias cords (of the first layer) 4 is 350 mm, and the total transverse dimension B of the bias cords (of the second layer) 5 is 225 mm. The rubber crawler thus formed satisfies a×A≈b×B.

Incidentally, at the time of manufacturing the rubber crawler, each bias cord is provided as a so-called coated cord that is formed by pressure-fixing a thin unvulcanized rubber sheet at both sides of the cord. These cords thus formed are laminated so as to form the first layer of bias cords and the second layer of bias cords. In the present invention, the second layer of bias cords is provided by simply tuning the same coated cord as used for the first layer upside down and placing it on the first layer. In this manner, a structure is obtained in which the bias cords of the first layer and the bias cords of the second layer are provided so as to form opposite angles ($\alpha,\beta$=38 degrees) to the main cord row. The first layer and the second layer have completely different transverse dimensions of bias cords, and therefore, there is no possibility that the first and second layers of bias cords are mistaken at the time of producing a lamination structure.

(Straight Driving Property Test)

The rubber crawler thus obtained was mounted on an actual machine and driven. At this time, if turning to the right or to the left occurred, the driving operation was repeatedly carried out after adjusting the wheel angle, and the wheel angle was adjusted until a straight driving property was obtained. The rubber crawlers thus tested were compared with each other based on the wheel angle when the straight driving property was obtained.

(Test Results)

In a conventional rubber crawler, that is, in the case when A≈B, the adjustment angle was 1.1 degrees. In the rubber crawler of the present invention, the adjustment angle was 0.05 degrees, thereby resulting in almost no adjustment of the wheel angle.

In the foregoing, there was shown a case in which two layers of bias cords are provided in the rubber crawler. However, when one layer of bias cords is used, a similar effect is obtained. In this case, by dividing one layer of bias cords into two sections in the transverse direction and embedding the bias cords in such a manner that one of these two sections is turned upside down so that the two sections have opposite bias angles, shear stresses of the rubber crawler can be neutralized. In this case, it is not necessary to form a space at the central portion of the bias cords and, needless to say, the bias cords can be freely set. Further, even in a case in which it is feared that the rigidity of rubber may be reduced due to a single layer of bias cords being used, it is possible to compensate for the reduction in rigidity by using a material having a high strength or a material having a large number of cords per unit width.

DESCRIPTION OF REFERENCE NUMERALS

1: rubber elastic body
2: guide projection
3: main cord row
4: bias cords (of the first layer)
5: bias cords (of the second layer)
6: lug
a, b: interval between main cord row and the respective bias cord rows
A: transverse dimension of main cord row
B: transverse dimension of bias cord row
α, β: bias angle of bias cord

What is claimed is:

1. A rubber crawler having an excellent straight driving property, comprising:
    an endless rubber elastic body;
    a main cord row embedded in the rubber elastic body in a longitudinal direction thereof;
    two layers of bias cords which are embedded at an outer peripheral side of the main cord row and form opposite bias angles;
    guide projections formed at the center of an inner peripheral surface of the rubber crawler at fixed pitches therebetween; and
    a lug formed on an outer peripheral surface of the rubber crawler,
    wherein bias cords of a first layer at a side near the main cord row are embedded at a fixed angle of inclination over a region having substantially the same transverse dimension as that of the main cord row, and bias cords of a second layer are divided into two sections, covering a region having substantially the same transverse dimension as that of the bias cords of the first layer other than a portion located directly below/above the guide projections, said bias cords of the second layer being embedded at an angle of inclination opposite to that of the bias cords of the first layer.

2. The rubber crawler having an excellent straight driving property according to claim 1, wherein right and left sections, in a transverse direction, of the bias cords of the second layer have substantially the same transverse dimension.

3. The rubber crawler having an excellent straight driving property according to claim 1, wherein respective side edges of the main cord row, the bias cords of the first layer, and the bias cords of the second layer in the transverse direction are embedded at positions substantially aligned on each of the two sides.

4. The rubber crawler having an excellent straight driving property according to claim 1, wherein respective bias angles of the two layers of bias cords with respect to the main cord are opposite and have the same angle.

5. The rubber crawler having an excellent straight driving property according to claim 4, wherein the bias angles of the bias cords of the two layers with respect to the main cords are set in the range of 25 to 45 degrees.

6. A rubber crawler having a good straight driving property, comprising:
    an endless rubber elastic body;
    a main cord row embedded in the rubber elastic body in a longitudinal direction thereof;
    two layers of bias cords which are embedded at an outer peripheral side of the main cord row and form opposite bias angles with respect to the main cord row;
    guide projections formed at the center of an inner peripheral surface of the rubber crawler at fixed pitches therebetween; and
    a lug formed on an outer peripheral surface of the rubber crawler,
    wherein bias cords of a first layer at a side near the main cord row are embedded, at a fixed angle of inclination with respect to the main cord row, over a region having substantially the same transverse dimension as that of the main cord row,
    bias cords of a second layer are divided into two sections in the transverse direction thereof, and the two sections cover a region having substantially the same transverse dimension as that of the bias cords of the first layer, other than a portion located directly below/above the guide portions, such that respective side edges of the main cord row, the bias cords of the first layer, and the bias cords of the second layer in the transverse direction are substantially aligned on each of the two sides, the bias cords of the second layer being arranged at an angle of inclination opposite to that of the bias cords of the first layer, and
    assuming that an interval between the main cord row and the bias cords of the first layer is represented by a, an interval between the main cord row and the bias cords of the second layer is represented by b, the transverse dimension of the bias cords of the first layer is represented by A, and the sum of the transverse dimensions of the right and left sections of the bias cords of the second layer is represented by B, said rubber crawler satisfies $a \times A = b \times B$.

* * * * *